(12) United States Patent
Sondergaard et al.

(10) Patent No.: US 9,483,967 B2
(45) Date of Patent: Nov. 1, 2016

(54) ADVERTISEMENT ELEMENT, A METHOD OF CREATING AN ADVERTISEMENT ELEMENT AND A METHOD OF CAPTURING ADVERTISEMENT IMAGES ON AN ADVERTISEMENT ELEMENT

(71) Applicant: Logo Paint A/S, Vejle (DK)

(72) Inventors: Christian Jokum Sondergaard, Norre Snede (DK); Soren Stovelbaek Larsen, Vejle (DK)

(73) Assignee: AMAYSE A/S, Vejle (DK)

( * ) Notice: Subject to any disclaimer, the term of this patent is extended or adjusted under 35 U.S.C. 154(b) by 0 days.

(21) Appl. No.: 14/406,430

(22) PCT Filed: Jul. 3, 2013

(86) PCT No.: PCT/DK2013/050220
§ 371 (c)(1),
(2) Date: Dec. 8, 2014

(87) PCT Pub. No.: WO2014/005594
PCT Pub. Date: Jan. 9, 2014

(65) Prior Publication Data
US 2015/0143728 A1    May 28, 2015

(30) Foreign Application Priority Data
Jul. 3, 2012 (EP) .................................. 12174740

(51) Int. Cl.
*G09F 19/14* (2006.01)
*G06Q 90/00* (2006.01)
*H04N 7/18* (2006.01)

(52) U.S. Cl.
CPC ............... *G09F 19/14* (2013.01); *G06Q 90/00* (2013.01); *H04N 7/181* (2013.01)

(58) Field of Classification Search
CPC ......................................................... G09F 19/14
USPC ................................................. 40/453, 427
See application file for complete search history.

(56) References Cited

U.S. PATENT DOCUMENTS 4,233,767 A *  11/1980  Hryhorczuk ............ G09F 19/14
                                                           40/437
5,598,650 A    2/1997  Brown
(Continued)

FOREIGN PATENT DOCUMENTS

DE    202005014815    11/2005
FR    2945371 A1      11/2010
(Continued)

OTHER PUBLICATIONS

International Search Report for PCT:DK2013:050220, mailed Oct. 10, 2013.

*Primary Examiner* — Joanne Silbermann
(74) *Attorney, Agent, or Firm* — Brinks Gilson & Lione

(57) ABSTRACT

An advertisement element (2) having an underside adapted for positioning on a flat surface and an upper side comprising an advertisement surface with advertisement information, wherein the advertisement surface comprises a plurality of protrusions (12), wherein each protrusion (12) comprises a first display surface (14) with graphics (18') applied to the surface, said surface (14) and graphics (18') being oriented towards a first predefined viewpoint (4) and a second display surface (16) with graphics (18") applied to the surface, said surface (16) and graphics (18") being oriented towards a second predefined viewpoint (6), and wherein the advertisement information comprises a first image (8) composed of the combined graphics (18') on the first display surfaces (14) and a second image (10) composed of the combined graphics (18") on the second display surfaces (16). A method of creating said advertisement element (2) and a method of capturing advertisement images.

20 Claims, 17 Drawing Sheets

(56) References Cited

U.S. PATENT DOCUMENTS

| | | |
|---|---|---|
| 6,001,456 A | 12/1999 | Newland |
| 6,133,892 A * | 10/2000 | Borgwardt .............. G09F 19/14 345/1.3 |
| 6,173,516 B1 * | 1/2001 | Duerrstein .............. G09F 19/14 160/370.23 |
| 6,176,521 B1 * | 1/2001 | Mancuso ............... B42D 15/00 283/85 |
| 2003/0173772 A1 | 9/2003 | Thomsen et al. |
| 2012/0148145 A1 * | 6/2012 | Liu ....................... G06T 7/0075 382/154 |

FOREIGN PATENT DOCUMENTS

| | | |
|---|---|---|
| GB | 2483310 A | 3/2012 |
| GB | 2484310 A | 4/2012 |
| WO | 2005010435 A1 | 2/2005 |
| WO | 2005104535 A1 | 11/2005 |
| WO | 2007042297 A2 | 4/2007 |

* cited by examiner

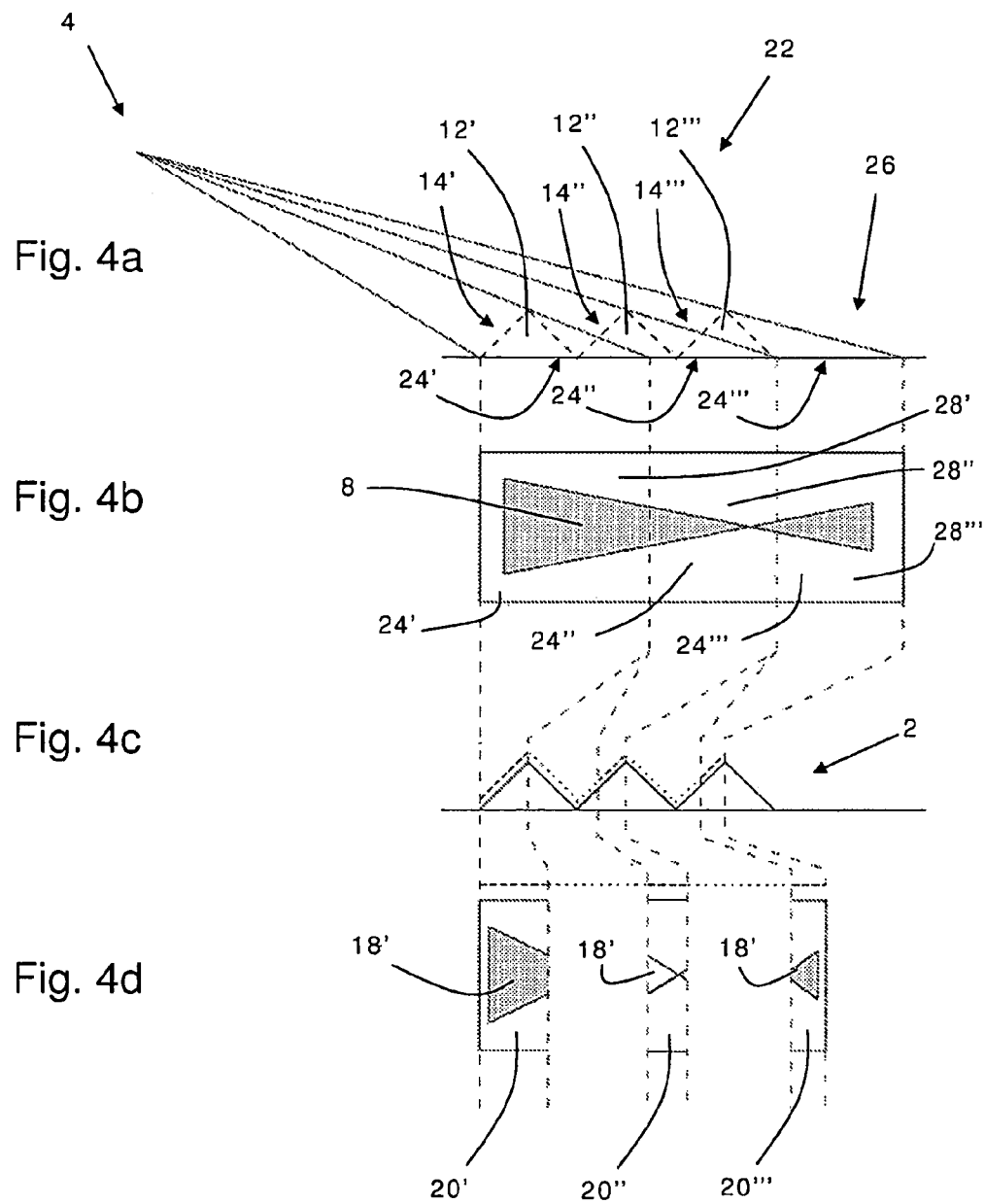

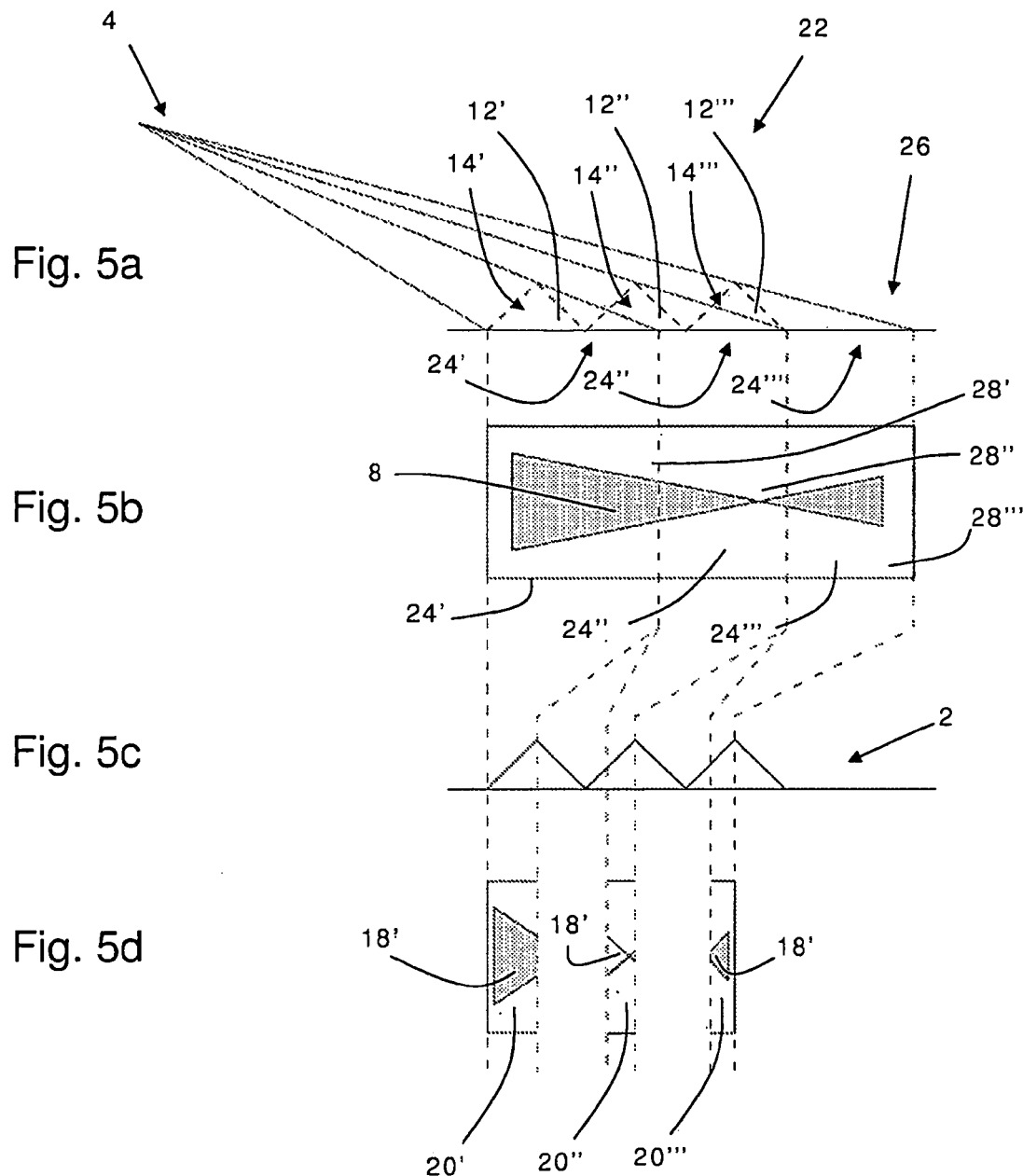

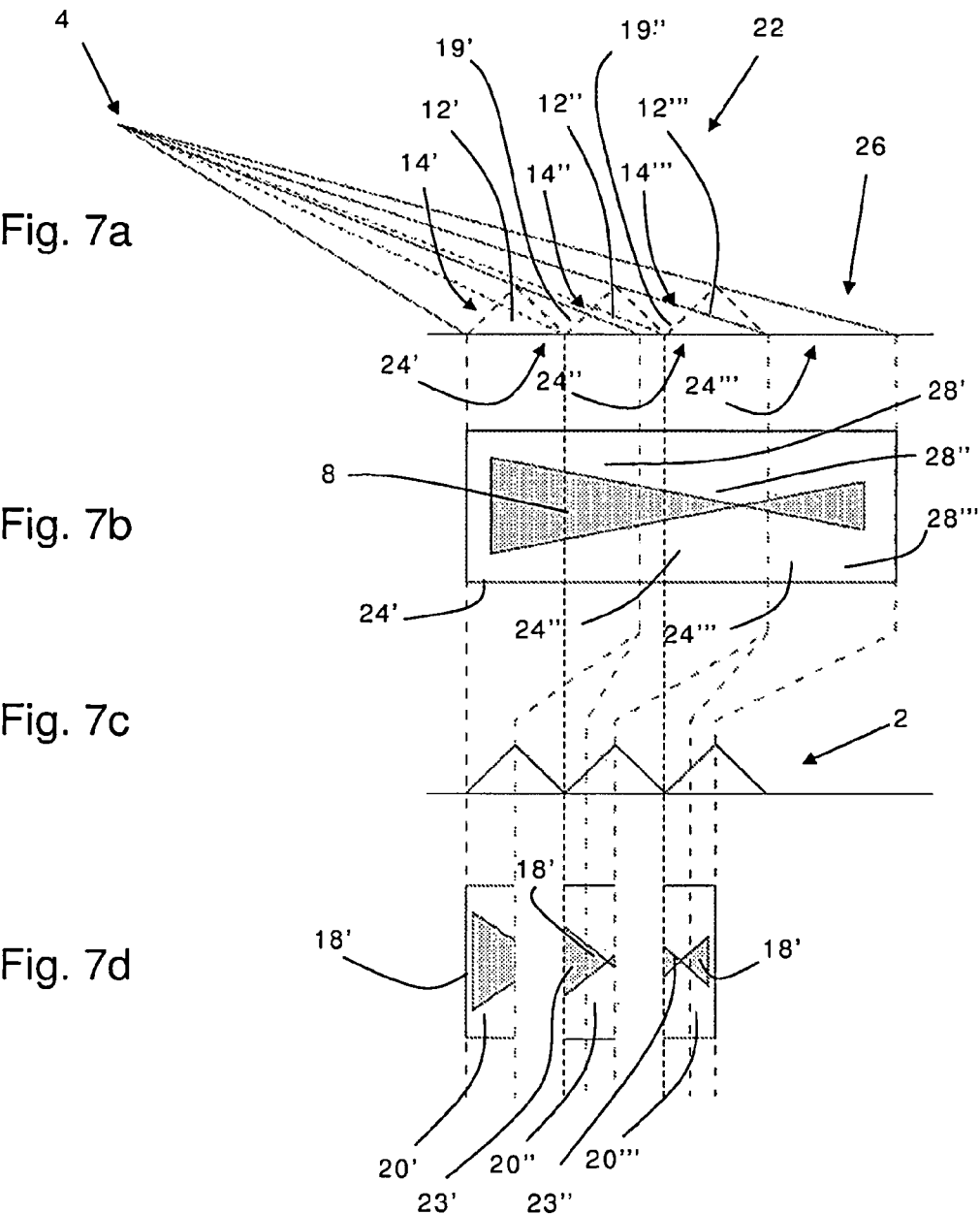

ADVERTISEMENT ELEMENT, A METHOD OF CREATING AN ADVERTISEMENT ELEMENT AND A METHOD OF CAPTURING ADVERTISEMENT IMAGES ON AN ADVERTISEMENT ELEMENT

RELATED APPLICATIONS

This application claims the benefit under 35 U.S.C. §371 of International Patent Application No. PCT/DK2013/050220, having an international filing date of Jul. 3, 2013, which claims priority to European Application No. 12174740.6, filed Jul. 3, 2012, the contents of which are incorporated herein by reference in their entirety.

FIELD OF THE INVENTION

The present invention relates to an advertisement element for positioning on a surface, a method of creating said advertisement element and a method of capturing advertisement images in a sports arena.

BACKGROUND OF THE INVENTION

The use of advertising panels in sports arenas is a common method for static advertising. Especially where the sports event is transmitted on television the resulting advertising effect is recognisable, as a potentially large number of people are exposed to the advertisement.

When transmitting team sports, e.g. football, American football, handball, basketball, ice hockey from a sports arena a number of television cameras are usually positioned around the playing field. The game can be transmitted to viewers of each team in a way such that cameras on one side of the field are transmitting to supporters of one team whereas the cameras on the other side of the field are transmitting to supporters of the other team.

Advertising panels on each side of the field may therefore be directed towards supporters of each team. For example during international events the advertising panels on one side of the field is therefore showing advertisements relevant for and perhaps even in the language of supporters of one team and advertising panels on the other side of the field is showing advertisements relevant for and perhaps even in the language of supporters of the other team.

From the viewpoint of a camera on one side of the field an advertisement facing the playing field on advertising panels on the opposite side of the field is visible to the camera, while an advertisement facing the playing field on advertising panels on the same side of the field is hidden to the camera.

However, advertising panels at either end of the field is visible from the cameras on both sides of the field. Therefore the advertisement will be transmitted to the supporters of both teams.

US 2003/0173772 describe an advertisement print that is optimised for at least two viewpoints. The advertisement is printed on a substantially plane print carrier. The print is a transformation of a three-dimensional element having a number of visible sides defined by a first and second viewpoint. The print comprises a first part being a perspective projection of one side of the three-dimensional element to the print carrier based on the line of sight from the first viewpoint. A second part is a perspective projection of a second side of the three-dimensional element to the print carrier based on the line of sight from the second viewpoint. The print can be viewed from both viewpoints. A perspective transformation will take place and the viewer will interpret the print as three-dimensional. Text, logos and other images can be printed on the carrier, such that they will appear to be positioned on the sides of the three-dimensional element.

It is a drawback of the advertisement print in US 2003/0173772 that, although a striking effect is achieved from both viewpoints, the advertisement would have to be relevant to the television viewers on both sides of the field. In sport events, e.g. international sport events the advertisers may have different text, figures or other information targeted towards local television viewers. This cannot be achieved on the advertisement print according to US 2003/0173772 without being visible to all viewers.

Another drawback of the advertisement print in US 2003/0173772 is that the advertisement space at either end of the playing field would have to be shared between advertisers relevant to the viewers on both sides.

OBJECT OF THE INVENTION

An object of the present invention is to provide a means of advertising that solves the above mentioned problems.

DESCRIPTION OF THE INVENTION

According to the present invention, this is achieved by an advertisement element having an underside adapted for positioning on a surface and an upper side comprising an advertisement surface with advertisement information. The advertisement surface comprises a plurality of protrusions. Each protrusion comprises a first display surface with graphics applied to the surface, said surface and graphics being visible from, i.e. oriented towards, a first predefined viewpoint and a second display surface with graphics applied to the surface, said surface and said graphics being visible from, i.e. oriented towards, a second predefined viewpoint. The advertisement information comprises a first image composed of graphics on the first display surfaces and a second image composed of graphics on the second display surfaces. The first display surface and the second display surface are separated by an edge which comprises a separation line separating graphics from said first display surface and said second display surface.

In an embodiment the advertisement element is made from a flexible material having a plurality of small protrusions each having a width between 5 mm and 100 mm and a height below 50 mm. Thereby the advertisement element which in an embodiment could have a length between 8 m and 12 m and a width between 8 m and 12 m, has a relatively high number of quite small protrusions e.g. between 80 and 2400.

The term "oriented towards" refer to the image being optimised for viewing from a predefined viewpoint. The image may be visible from other positions, but the intended experience is available at the predefined viewpoint. This may be done by transforming the image, such that the experience of a viewer located in the predefined viewpoint will be optimised or with a perpendicular arrangement between a surface and a viewing angle, such as a viewing angle to or from a predefined viewpoint.

The separation line could in an embodiment have a single colour e.g. being a grey colour, such as 30% grey.

By having a separation line on the edge between said display surfaces, it is avoided that graphics on one display surface disturb the visual impression of the graphics on the opposite display surface. E.g. if graphics on display surface have a very characteristic colour then this could disturb the graphics on the opposite display surface.

Graphics are applied to the part of each display surface being visible from respectively the first and second predefined viewpoint. Thereby information from the graphics is not lost and an exact impression of the graphical object and thereby the advertisement information is ensured.

The remaining parts of the first and second display surfaces could comprise a drop line by stretching the end of the graphics from the visible parts. Alternatively the remaining parts of the first and second display surfaces comprise a solid colour. Thereby it is ensured that by using a viewpoint different from the predefined viewpoint then an acceptable impression of the graphical object is still obtained.

Moreover this is achieved by a method of capturing advertisement images. The method includes positioning a first image capturing device in a first predefined viewpoint and a second image capturing device in a second predefined viewpoint, positioning an advertisement element in the line-of-sight of the first and second image capturing device, such that the first image is visible from the first predefined viewpoint and such that the second image is visible from the second predefined viewpoint, and capturing the first and/or second image by means of the first and/or second image capturing device respectively. Herein, the term "visible from" a particular viewpoint may encompass the requirement that the image is optimised for being viewed from that viewpoint or from a viewing angle corresponding to that viewpoint.

Furthermore this is achieved by a method of creating an advertisement element. The method includes establishing the relative positions of the advertising element and a first and second predefined viewpoint, preparing the advertising element based on said relative positions to form the first image and the second image, such that each image appear coherent when viewed from the first predefined viewpoint or the second predefined viewpoint, respectively.

In the present application the term "coherent" is used to describe an image that although it is composed of a plurality of smaller fragments, i.e. tiles with graphics applied to them and applied to the protrusions, appear as a single unbroken image without gaps, when viewed from a respective predefined viewpoint.

It is herewith achieved that two images can be displayed on the same advertisement element, in such a way that when viewed from one of the two predefined viewpoints the advertisement element appear to display only one coherent image.

In this context, a "predefined viewpoint" may signify a viewpoint from which a relevant image appears optimised, coherent and/or fully resolved. It will be appreciated that when one image is viewed along an angle for which it appears optimised, then the other image or images on the advertising element will not be visible.

In the present application the term "image" means the graphic information as it appears to a viewer or image capturing device located at the respective predefined viewpoints. The graphic information may comprise photos, graphics, text etc. An image may comprise a plurality of smaller images each providing its own separate advertisement information.

Moreover it is achieved that the same advertisement element can display the first image directed towards the first predefined viewpoint and the second image directed towards the second predefined viewpoint on what would appear to be the same region of the advertisement element when viewed from either predefined viewpoint.

It is therefore possible to fill the entire surface area next to or on a playing field with advertisements directed towards the first and second predefined viewpoint at the same time.

When viewing the advertisements according to the invention next to or on the playing field, they visually appear as all being directed towards the predefined viewpoint. Advertisers relevant to the predefined viewpoint on only one side of the playing field can share the same advertisement space at either end of or on the playing field as other advertisers relevant to the predefined viewpoint on the other side of the playing field.

A person can be present as a viewer in the predefined viewpoint.

The invention is especially relevant when an image capturing device is located in each predefined viewpoint.

Examples of image capturing devices are television cameras, video cameras and photographic cameras.

In an embodiment of the advertisement element the advertisement element is a substantially plane element with a flat underside that is adapted for positioning on a substantially flat surface for example a playing field.

In an embodiment of the advertisement element the advertisement element is an advertisement carpet that can be rolled out with the underside supported on the surface.

When the advertisement carpet is not in use the carpet may be rolled back into a roll and removed from the flat surface for storage elsewhere. The surface may be flat, for example a concrete surface, substantially flat, for example grass, or having a plurality of areas that may be angled in relation to each other. Moreover the surface may be curved, which is advantageous for example in relation to motor sports and track cycling.

During the design of the advertisement element, the shape and properties of the surface that the advertisement element is positioned on may be taken into account, such that the appearance of the advertisement information is not distorted.

The advertisement element has an upper side comprising an advertisement surface where the advertisement information is displayed. The advertisement information may for example be company logos, images, statements etc.

A plurality of protrusions is formed on the advertisement surface. Each protrusion has a first display surface. Graphics are applied to each first display surface. The protrusions are configured such that the graphics that are applied to the first display surface is visible from the first predefined viewpoint. The graphics on the first display surfaces when combined will form the first image. The first image is coherent when viewed from the first predefined viewpoint.

In order to create the first image it first has to be pre-processed based on the configuration of the protrusions. Pre-processing includes dividing the first image into tiles. Each tile is adapted for being applied to a specific protrusion. The adaptation of each tile is based on the shape of the protrusion and its position on the advertisement element, such that when all tiles are applied to the display surfaces of the first protrusions, the graphics of each tile will combine to display a first image. In other words each tile will connect to the next tile on an adjacent protrusion. The first image will appear as a coherent image, when viewed from the first predefined viewpoint.

Each protrusion has a second display surface. Graphics are applied to each second display surface as described for the first display surface above, such that the second image will appear as a coherent image, when viewed from the second predefined viewpoint.

In an embodiment of the advertisement element according to the invention the protrusions has a uniform cross-sectional profile and extend across the advertisement element.

The protrusions form ridges and valleys on the advertisement element.

In an embodiment of the advertisement element according to the invention the graphics are applied by printing directly onto the first and/or second display surface. This will provide a static first and second image.

In an embodiment of the advertisement element according to the invention the graphics are applied by printing on a print carrier and applying the print carrier to the first and/or second display surface. This will provide a static first and second image.

The print carrier may have a size corresponding to a tile, such that a number of print carriers are applied to form the complete advertisement element.

The print carrier may have a size corresponding to the combined surface area of the first and second display surfaces, such that the print carrier can be applied to the advertisement element as a single piece. The print carrier is folded to follow the surface contour of the advertisement element defined by the protrusions.

In an embodiment of the advertisement element according to the invention the graphics are applied to the first surface and/or second display surface by means of a non-permanent display means. Examples of such non-permanent display means are LCD-displays and LED/OLED-displays. This will facilitate easy replacement of the first and/or second image.

Preferably the second image is invisible, when the advertisement element is viewed from the first predefined viewpoint.

Preferably the first image is invisible when the advertisement element is viewed from the second predefined viewpoint.

The first image is visible from the first predefined viewpoint at the same time as the second image is visible from the second predefined viewpoint.

In an embodiment of the advertisement element the line of sight from the first predefined viewpoint and/or the second predefined viewpoint is parallel with a centerline through the advertisement element.

In an embodiment of the advertisement element the line of sight from the first predefined viewpoint and/or the second predefined viewpoint is slanted in relation to a centerline through the advertisement element.

In an embodiment of the advertisement element the advertisement element is adapted for being removable from the flat surface that it is positioned on. This enables the advertisement information to be easily changed or moved to different locations, provided that the predefined viewpoints and the advertisement element is located with unaltered relative positions.

When used in connection with sports events the relevance of the advertisement information may change between each event. The advertisement element may be adapted for removability by simply placing the advertisement element on the flat surface without attaching it to the surface or attaching the advertisement element with removable fasteners.

Advertisement elements to be used in a sports field may have sizes ranging from 10 square meters to in excess of 175 square meters.

In an embodiment the advertisement element is composed of a plurality of smaller sections.

According to a further embodiment, the advertisement element according to the invention is peculiar, in that each protrusion is configured such that the first-display surface is occluded by the second display surface when the advertisement element is viewed from the second predefined viewpoint and/or such that the second display surface is occluded by the first display surface when the advertisement element is viewed from the first predefined viewpoint.

It is herewith achieved that the first image is visible and the second image is invisible when the advertisement element is viewed from the first predefined viewpoint and/or that the first image is invisible and the second image is visible when the advertisement element is viewed from the second predefined viewpoint.

The protrusions are configured such that the protrusion closer to a particular viewpoint is occluding the display surface directed towards the other viewpoint.

According to a further embodiment, the advertisement element according to the invention is peculiar in that, the first and second display surfaces are arranged in a back-to-back configuration.

The term back-to-back in this context is not intended to be restricted to configurations relating solely to alternate sides of a material sheet or wall. Instead, the term is to be understood to denote that the respective surfaces are arranged along a boundary such that they are oriented generally away from each other.

It is herewith achieved that the advertisement element can be manufactured in a particular simple manner. The protrusions in the back-to-back configuration can be extruded and subsequently applied to the advertisement element, or the advertisement element can be extruded in one piece.

In an embodiment of the advertisement element the cross-sectional profile of the protrusions may be triangular. This shape can be extruded such that the protrusions are continuous elements extending in one direction.

In this configuration the protrusions can advantageously be configured such that the protrusion closer to a particular viewpoint when viewed from that viewpoint is occluding the display surface directed towards the other viewpoint.

The triangle forming the protrusions in this embodiment may be an equilateral or isosceles triangle.

It is herewith achieved that the complexity of transforming and applying the images to the first and second display surfaces is reduced, because the advertisement element can be symmetrical.

In another embodiment the triangle may be a scalene triangle. The area of the first and second display surfaces will be different. However the first and second images may still have the same size as for a symmetrical configuration of the advertisement element having a given footprint. The image information/image quality may therefore be different between the first and second images because of the difference in surface area of the first and second display surfaces. This embodiment is therefore advantageous, when the distance from one of the first or second predefined viewpoints to the advertisement element is longer than the other. The image assigned to the predefined viewpoint with the longest distance may be applied to the display surface having the largest surface area and vice versa.

According to a further embodiment, the advertisement element according to the invention is peculiar in that, the first and/or second image is an inverse perspective image having its line-of-sight corresponding to a line-of-sight from the first and/or second predefined viewpoint, respectively.

The term line-of-sight in this context denotes that viewpoint or viewing angle in three dimensional space, relative to the advertisement element, from or along which the advertisement element generates a coherent first or second or third etc. image. An advertisement element for an image which is prepared in its distorted, or pre-compensated, fragmented form, for the purposes of the present invention will generate an image which appears unresolved i.e. more or less distorted, or suboptimal from all angles or viewpoints other than the intended line-of-sight.

It is herewith achieved that the first and/or second image will appear to be in front of or above the advertisement element. The advertisement information on an advertisement element will thereby stand out among adjacent advertisement elements.

The inverse perspective transformation is applied to each image before the transformation of the image into tiles. The tiled image is thereby applied as graphics to the display surfaces.

According to a further embodiment, the advertisement element according to the invention is peculiar in that, at least one of the first and/or second display surface is a planar surface.

It is herewith achieved that the transformation of the image into graphics to be applied to the planar display surface(s) is simplified. Moreover the practical application of the graphics to the display surface is simpler.

This embodiment applies equally well to graphics applied as one of the printing methods discussed above or graphics applied as one of the previously mentioned non-permanent display means.

In alternative embodiments the first and/or second display surface has a single or double curvature.

According to a further embodiment, the advertisement element according to the invention is peculiar in that, at least one of the first and/or second display surface is a faceted surface.

A faceted surface may comprise multiple facets, wherein each facet is inclined in relation to the prevailing plane of the relevant display surface or display surface fragment.

It is herewith achieved that the effect of reflections of light between adjacent first and second display surfaces onto each other causing degraded image quality may be reduced because the focal point of the display surfaces are not a single point.

In one embodiment the first display surface is planar and the second display surface is faceted.

In one embodiment the first display surface is faceted and the second display surface is planar.

In one embodiment the first and the second display surface is planar.

In one embodiment the first and second display surface is faceted.

According to a further embodiment, the advertisement element according to the invention is peculiar in that, the element comprises a diffusing, i.e. a light-diffusing material, for providing a diffuse reflection of light from its first and/or second display surface.

It is herewith achieved that the perceived image quality is better because reflections from one display surface onto the adjacent display surface are avoided or reduced.

An example of this is an advertisement element having display surface in a configuration where first display surfaces of the protrusions are facing second display surfaces of the protrusions. In this case a display surface may in some conditions reflect light onto an opposite display surface. This will reduce the quality of the perception of the image where light from an opposite display surface is reflected onto a display surface of the image.

When a diffusing material is used, the reflection of light will be diffuse and negligible in relation to the image perception.

Examples of diffusing materials may include open cell foam, thin fibre non-wovens or nanoetched surfaces.

According to a further embodiment, the advertisement element according to the invention is peculiar in that, the first and second display surfaces have a low specular reflectivity.

It is herewith achieved that the perceived image quality is better because reflections from one display surface onto the adjacent display surface are avoided or reduced.

The effect of a display surface with a low specular reflectivity is similar to the effect described in the example above for a diffuse material.

A display surface with a low specular reflectivity is also known as a surface with a matt finish. This may be achieved by using a matt paint to apply the graphics onto the advertisement element.

Alternatively it can be applied as a coating onto the finished graphics.

An ideal display surface would exhibit Lambertian reflectance. Then light is scattered such that the apparent brightness of the surface to an observer is the same regardless of the viewing angle. In this case no specular highlights will appear on the surface when viewed from different angles.

According to a further embodiment, the advertisement element according to the invention is peculiar in that, each protrusion comprises at least one additional display surface with graphics, said surface and said graphics being oriented towards one additional predefined viewpoint per additional display surface, applied to the surface, and that the advertisement information comprises one additional image per additional display surface composed of graphics on said at least one additional display surface.

It is herewith achieved that additional predefined viewpoints within the sports arena may benefit of the effects of the advertisement element according to the invention.

According to a further embodiment, the advertisement element according to the invention is peculiar in that, each protrusion comprises one additional display surface with graphics, said surface and said graphics being oriented towards one additional predefined viewpoint, applied to the surface, and that the advertisement information comprises one additional image composed of the combined graphics on said one additional display surface.

It is herewith achieved that three images may be displayed on the advertisement element.

In an embodiment of the advertisement element according to the invention the protrusions are shaped as tetrahedrons.

This embodiment of the advertisement element according to the invention is peculiar in that the advertisement surface comprises a plurality of protrusions, wherein each protrusion comprises a first display surface with graphics, that is visible from a first predefined viewpoint, applied to the surface, a second display surface with graphics, that is visible from a second predefined viewpoint, applied to the surface and a third display surface with graphics, that is visible from a third predefined viewpoint, applied to the surface, and wherein the advertisement information comprises a first image composed of the combined graphics on the first display surfaces, a second image composed of the combined graphics on the second display surfaces and a third image composed of the combined graphics on the third display surfaces.

It is herewith achieved that the advertisement element can be directed towards three predefined viewpoints.

According to a further embodiment, the method of creating an advertisement element according to the invention is peculiar in that, the preparation of the advertising element includes;

configuring the protrusions for displaying on the advertising element, the first image to be visible from the first predefined viewpoint and composed of the graphics on the first display surfaces, and the second image to be visible from the second predefined viewpoint and composed of graphics on the second display surfaces, dividing the first and second image into tiles corresponding to the graphics to be applied to the first and second display surfaces, respectively, and applying the tiles in the form of graphics to the first and second display surfaces, respectively.

It is herewith achieved that the first and second images are applied to the advertisement element in a way that is specifically adapted to the two predefined viewpoints and the protrusions.

In this context, the term "visible from" a predefined viewpoint may signify that the relevant image is optimised for the particular viewpoint or for a viewing angle corresponding to the viewpoint.

When dividing the first and second image into tiles the part of the first display surfaces visible from the first predefined viewpoint and the part of the second display surfaces visible from the second predefined viewpoint must be taken into consideration as only part of the respective display surfaces may be visible from the respective predefined viewpoints.

According to a further embodiment, the method of creating an advertisement element according to the invention is peculiar in that, the preparation of the advertising element includes; applying a transformation to the first and second image before dividing the image into tiles.

It is herewith achieved that the perception and the general experience from the predefined viewpoints by the viewers of the advertisement element are enhanced.

According to a further embodiment, the method of creating an advertisement element according to the invention is peculiar in that, the transformation is selected among inverse perspective transformations, stretching, skewing, affine transformations, colour transformation, colour enhancement, sharpening, blurring and/or ray tracing.

With an inverse perspective transformation it is achieved that the first and/or second image will appear to be in front of or above the advertisement element. In other words, the advertisement information may appear to be a 3D object. The advertisement information on an advertisement element will thereby stand out among adjacent advertisement elements.

The inverse perspective transformation is applied to each image before the transformation of the image into tiles. Afterwards the tiled image is applied as graphics to the display surfaces.

With by stretching the image may appear closer to 3D object. The stretching is simpler to apply than an inverse perspective transformation.

With skewing it is achieved that the appearance when the advertisement element is located at an angle from a predefined viewpoint is enhanced.

With affine transformations, the perception of the image may be enhanced in a simpler manner than for example inverse perspective transformation.

With colour transformation, the colours of the image may take into account the colours of the lighting at the intended location.

With sharpening a blurred image may appear sharper to the viewer.

With blurring a sharp image may appear blurred to the viewer.

With ray tracing, the most realistic appearance of the image can be achieved.

Two or more of the transformations mentioned above may be combined.

The effect of combining inverse perspective transformations and ray tracing may provide a particularly realistic image perceived by the viewer at the predefined viewpoint to be a 3D object.

According to a further embodiment, the advertisement element according to the invention is peculiar in that, the element is composed of a soft, pliable material with good resilience properties, such that the element returns to its original shape as quickly as possible after a deformation.

Deformation of the element may for example occur when an athlete comes into contact with the advertisement element.

It is herewith achieved that the safety of the athletes is improved. Even hard contact with the advertisement element will not injure the athlete.

Moreover transportability of the advertisement element is enhanced because it may be bent or rolled during packing. It would even be possible to vacuum pack the advertisement element thereby greatly reducing the volume of the advertisement element during shipment and storage.

Examples of soft pliable materials include rubber, polychloroprene, polyether and polyurethane, polyester and polyvinylchloride preferably in a foamed configuration.

Although the advertisement element is especially suited for advertisement on the playing field of a sports arena, it may also be suited for other types of use. Moreover the advertisement element may be used to display advertisements or general information.

For example, the advertisement element may be used as a door mat capable of displaying information to a person entering a shop as well as a person leaving the shop. An example of such information can, in this configuration, be "Welcome", when the person enters the shop and "Goodbye", when the person leaves the shop. Another example is a picture of a promoted product, when the person enters the shop, and a picture of the promoted product together with a text message to remind the customer to purchase the product when leaving the shop.

DESCRIPTION OF THE DRAWINGS

The invention will be explained in more detail below with reference to the accompanying drawing, where:

FIG. 4a-d illustrates the conversion of the image into tiles in an embodiment, wherein the tiles are applied to a print carrier, FIG. 5a-d illustrates the conversion of the image into tiles in an embodiment, wherein the tiles are applied by printing directly on the advertisement element, FIG. 7a-d illustrates the conversion of the image into tiles in an embodiment, wherein the tiles are applied by printing directly on the advertisement element, and wherein an image overlap is added to the tiles.

DETAILED DESCRIPTION OF THE INVENTION

In the explanation of the figures, identical or corresponding elements will be provided with the same designations in different figures. Therefore, no explanation of all details will be given in connection with each single figure/embodiment.

Figure 1A:
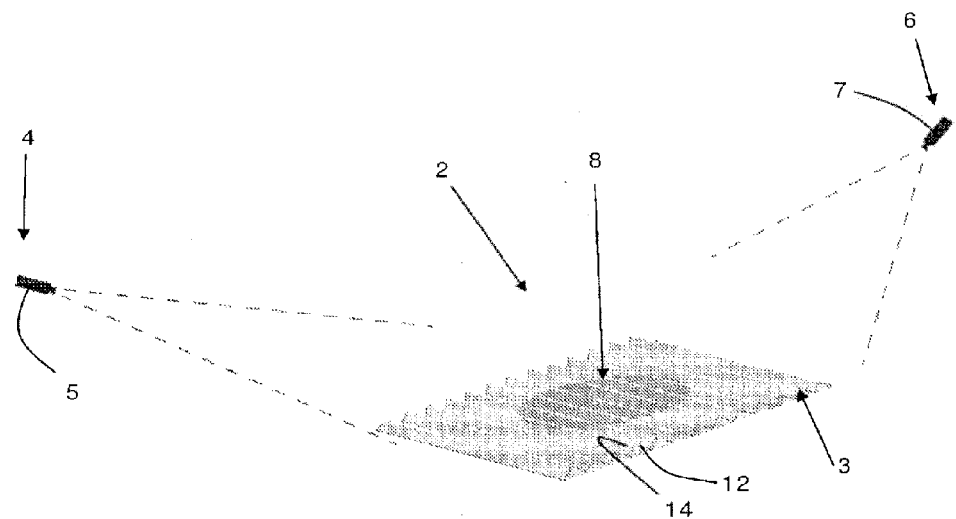
FIG. 1a illustrates an advertisement element in relation to the predefined viewpoints, where the first image is visible.
Figure 1B:
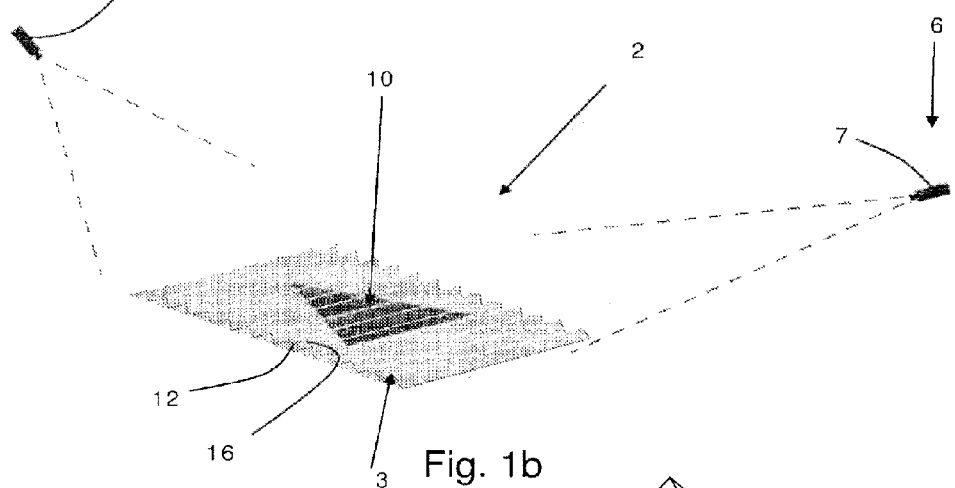
FIG. 1b illustrates the advertisement element of FIG. 1, where the second image is visible.
Figure 1C:
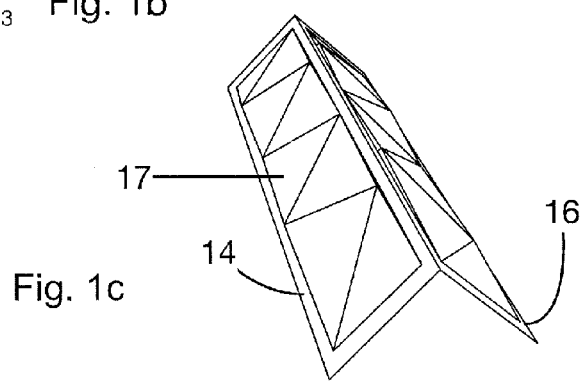
FIG. 1c illustrates exemplary faceted surfaces 17 on first and second display surfaces of the element.

FIGS. 1a and 1b illustrates the advertisement element 2 in relation to the predefined viewpoints 4, 6. FIG. 1a illustrates the advertisement element 2 with the first image 8 visible and FIG. 1b illustrates the advertisement element 2 with the second image 10 visible.

The first and second images 8, 10 on FIGS. 1a and 1b are only for illustrative purposes. The first and second images 8, 10 should be interpreted as being viewed from the line of sight of the respective viewpoints 4, 6. The purpose of the figures is to show the relative positions of the first predefined viewpoint 4, the second predefined viewpoint 6 and the advertisement element 2.

On FIG. 1a the first image 8, depicting a filled circle, is visible, as the advertisement element 2 is viewed from the first predefined viewpoint 4.

On FIG. 1b the second image 10, depicting a filled triangle, is visible, as the advertisement element 2 is viewed from the second predefined viewpoint 6.

The advertisement element 2 is configured for a specific location in relation to the predefined viewpoints 4, 6. Therefore the relative positions of the advertisement element 2 and the predefined viewpoints 4, 6 are input parameters when preparing the advertisement element 2 such that the first image 8 appears as a coherent image when viewed from the first predefined viewpoint 4 and that the second image 10 appear as a coherent image when viewed from the second viewpoint 6.

The advertisement element 2 has an advertisement surface comprising a plurality of protrusions 12. Each protrusion 12 has a first display surface 14 (see FIG. 1a) and a second display surface 16 (see FIG. 1b).

Each protrusion 12 has an edge 3 which comprises a separation line separating graphics from said first display surface (14) and said second display surface (16). This separation line could have a thickness of 1 mm and the colour could be chosen as a medium colour between the colours of the graphics on each display surface. Alternatively the separation line could be grey e.g. a 30% grey. Another alternative is that the colour is chosen as the colour of the less dominating colour of the neighbouring pixels of the graphics of each display surface.

The advertisement element 2 in FIGS. 1a and 1b has a rectangular shape.

In alternative embodiments the advertisement element 2, when seen from above, may be circular, oval, triangular, square, pentagonal, hexagonal, heptagonal, octagonal, or another polygonal or hybrid shape having an outline comprising straight lines and/or curved lines.

In a preferred embodiment, the advertisement element 2 comprises two trapezoids merged together as can be seen on FIG. 5.

In the first predefined viewpoint 4 a first image capturing device 5 can be positioned for capturing the first image 8. For example during a sports event the first image capturing device 5 is a television camera. The first image 8 is captured by means of the first image capturing device 5 and transmitted to television viewers.

In the second predefined viewpoint 6 a second image capturing device 7 can be positioned for capturing the second image 10. For example during a sports event the second image capturing device 7 is a television camera. The second image 10 is captured by means of the second image capturing device 7 and transmitted to television viewers.

Figure 2:
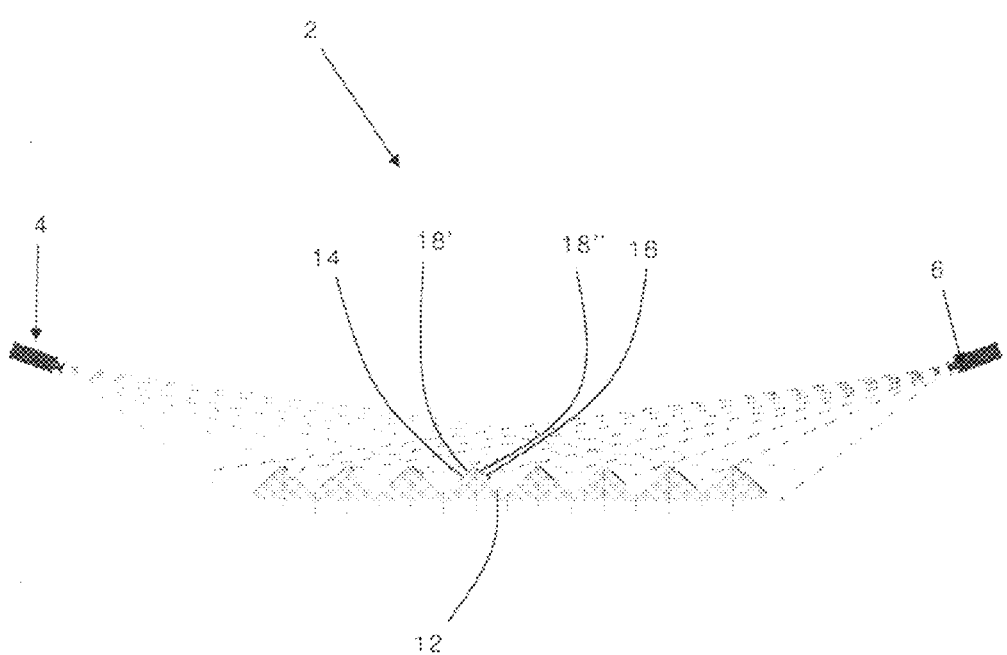
FIG. 2 illustrates, on a cross section of the advertisement element, the first and second display surfaces.

FIG. 2 illustrates, on a cross section of the advertisement element 2, the first and second display surfaces 14, 16 on the protrusions 12. It will be appreciated in this context that each of the illustrated first and second display surface 14, 16 is comprised of surface fragments, wherein each protrusion 12 presents a fragment or sub-surface of respective first 14 and second 16 surfaces.

The first display surface 14 has graphics 18' applied to it. The graphics 18' are visible from the first predefined viewpoint 4.

The second display surface 16 has graphics 18" applied to it. The graphics 18" are visible from the second predefined viewpoint 6.

When the advertisement element 2 is viewed from the first predefined viewpoint 4, each protrusion 12 is configured such that the second display surface 16 is occluded by the first display surface 14. When the advertisement element 2 is viewed from the second predefined viewpoint 6, each protrusion 12 is configured such that the first display surface 14 is occluded by the second display surface 16. Therefore, the second display surfaces 16 of the advertisement element 2 are hidden to the first predefined viewpoint 4 and the first display surfaces 14 of the advertisement element 2 are hidden to the first predefined viewpoint 6.

In the embodiment shown, the first and second display surfaces 14, 16 are arranged in a back-to-back configuration.

In the embodiment shown, each first and second display surface 14, 16 is a planar surface.

Figure 3A:
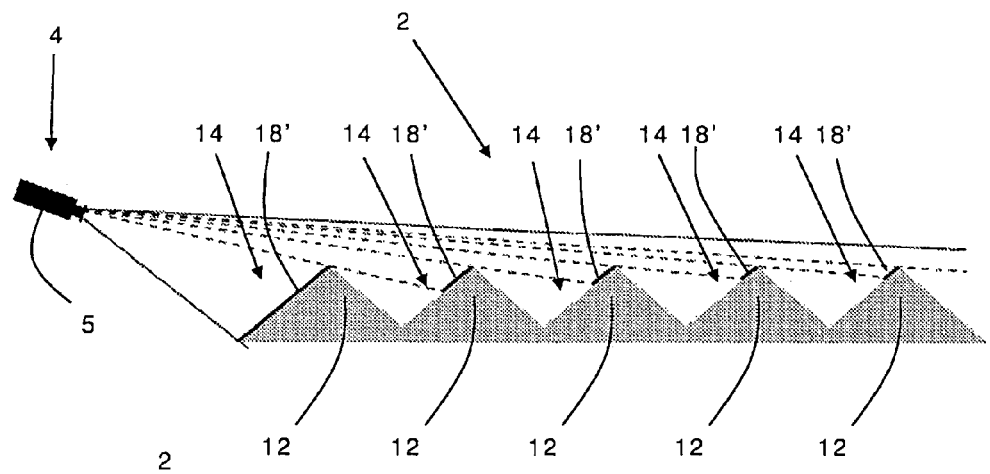
FIG. 3a is a detail view of the advertisement element of FIG. 2 showing the first display surfaces in relation to the first predefined viewpoint.
Figure 3B:
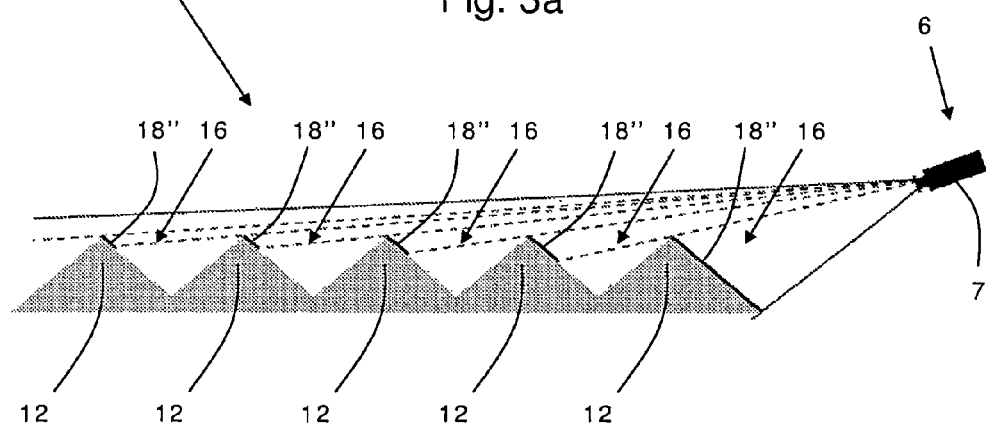
FIG. 3b is a detail view of the advertisement element of FIG. 2 showing the second display surfaces in relation to the second predefined viewpoint.
Figures 6A, 6B, 6C, 6D:
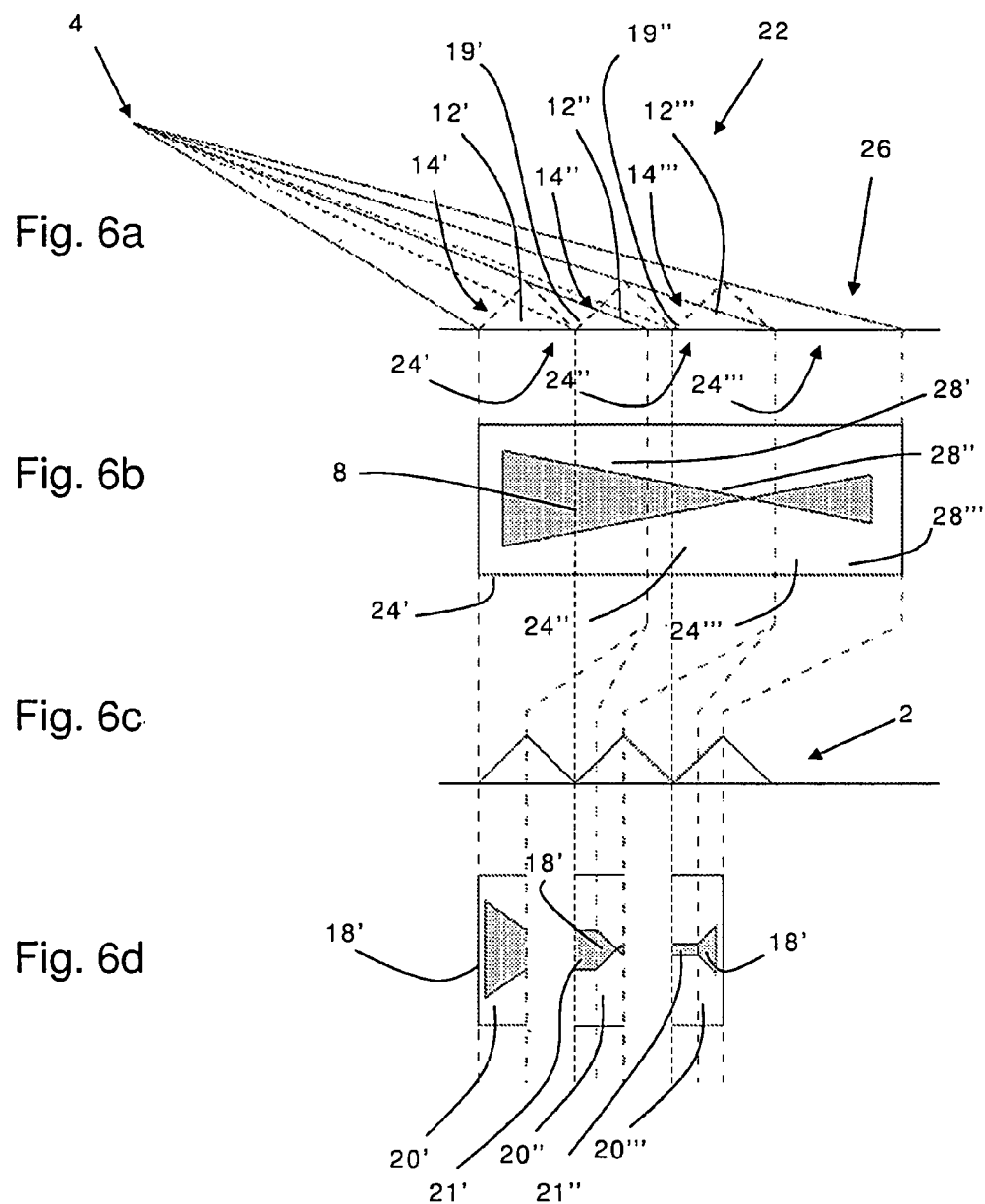
FIG. 6a-d illustrates the conversion of the image into tiles in an embodiment, wherein the tiles are applied by printing directly on the advertisement element, and wherein a dropline is added to the tiles.

FIGS. 3a and 3b are detailed views of the advertisement element 2 of FIG. 2 separately showing the first display surfaces 14 in relation to the first predefined viewpoint 4 and the second display surfaces 16 in relation to the second predefined viewpoint 6.

The area of graphics 18' that is visible from the first predefined viewpoint 4 is gradually decreasing towards the end of the advertisement element 2 that is closer to the second predefined viewpoint 6. This is because the proximate protrusion 12 to the first predefined viewpoint 4 of two adjacent protrusions 12 occludes part of the first display surface 14 of the distant protrusion 12.

The complete first display surface 14 of the protrusion 12 closest to the first predefined viewpoint 4 is visible from the first predefined viewpoint 4.

The area of graphics 18" that is visible from the second predefined viewpoint 6 is gradually decreasing towards the end of the advertisement element 2 that is closer to the first predefined viewpoint 4. This is because the proximate protrusion 12 to the second predefined viewpoint 6 of two adjacent protrusions 12 occludes part of the second display surface 16 of the distant protrusion 12.

The complete second display surface 16 of the protrusion 12 closest to the second predefined viewpoint 6 is visible from the second predefined viewpoint 6.

The shape of the protrusions 12 are configured based on the relative positions of the advertisement element 2, the first predefined viewpoint 4 and the second predefined viewpoint 6 and by using the teachings of geometry and trigonometry. Alternatively more advanced techniques like ray tracing or projections in 3D vector space may be used.

The protrusions 12 are configured for displaying on the advertising element 2 the first image 8 to be visible from the first predefined viewpoint 4. The first image 8 is composed of the combined graphics 18' on the first display surfaces 14.

The protrusions 12 are configured for displaying on the advertising element 2 the second image 10 to be visible from the second predefined viewpoint 6. The second image 10 is composed of the combined graphics 18" on the second display surfaces 16.

Based on the shape of the protrusions and the relative positions of the advertisement element 2, the first predefined viewpoint 4 and the second predefined viewpoint 6, the first and second image 8, 10 are divided into tiles (see FIGS. 4 and 5). The tiles (see FIGS. 4 and 5) are applied to the respective display surfaces 14, 16 as graphics 18', 18".

FIG. 4a-d illustrates the conversion of the first image 8 into tiles in an embodiment, wherein the tiles are applied to a print carrier. For clarity reasons FIG. 4a-d shows the conversion for the first predefined viewpoint 4 only. The skilled person would be capable of applying the teaching to the second predefined viewpoint 6.

On FIG. 4a the first predefined viewpoint 4 is located above and to the left of the planned position 22 of the advertisement element 2 (indicated by dotted lines). The planned positions of first 12', second 12" and third 12''' protrusions with respective first display surfaces 14', 14", 14''' are also indicated by dotted lines.

The first display surfaces 14', 14", 14''' of the first 12', second 12" and third 12''' protrusions will cast a first 24', second 24" and third 24''' shadow on the support surface 26 for the advertisement element 2.

The first 24', second 24" and third 24''' shadows are viewed from above on FIG. 4b. The first image 8 to be displayed on the advertisement element 2 and to be visible from the first predefined viewpoint 4 is indicated on the combined shadows 24', 24", 24'''.

As is apparent from FIG. 4a-b, the first image 8, when viewed from the first predefined viewpoint, will appear to have a larger footprint than the actual footprint of the advertisement element 2.

The first image 8 is divided into first image tiles 28', 28", 28''' corresponding to the shadows 24', 24", 24''', respectively, to be cast by the first display surfaces 14', 14", 14''' onto the support surface 26.

The width of the part visible from the first predefined viewpoint 4 of each first display surface 14', 14", 14''' is measured. The first image tiles 28', 28", 28''' are then shrunk to fit the width of the part visible from the first predefined viewpoint 4 of each first display surface 14', 14", 14''', respectively.

FIG. 4d shows the resulting tiles 20', 20", 20''' having graphics 18' applied to them corresponding to the first image 8, when they are applied to the respective display surfaces 14', 14", 14'''.

These tiles 20', 20", 20''' may be applied to a print carrier and thereafter affixed to the respective display surfaces 14', 14", 14''' of the advertisement element 2. The tiles 20', 20", 20''' will then combine into a coherent image that, when viewed from the first predefined viewpoint 4, will appear as the first image 8 shown on FIG. 4b.

The tiles 20', 20", 20''' may be coupled together to form a web (not shown) with other tiles to form the second image 10 (not shown) to be visible from the second predefined viewpoint 6 (not shown) and intermediate tiles without graphics or with drop lines or image information from the previous display surface to hide imperfections in the advertisement element. The web may be folded to form the protrusions of the advertisement element 2 in it self or affixed to the surface of the advertisement element 2.

For example this could be done by thermoforming the upper side of the advertising element 2 with its relevant protrusions 12 before or after printing and/or laminating a printed carrier to the upper side of the advertising element 2.

Such a web (not shown) adapted for the advertisement element 2 shown in FIG. 4c having three protrusions will consist of, from left to right; a tile 20' of the first image 8 a tile of the second image 10 an intermediate tile hidden from both predefined viewpoints, a tile 20" of the first image 8 a tile of the second image 10 an intermediate tile hidden from both predefined viewpoints, a tile 20''' of the first image 8 and finally a tile of the second image 10.

The skilled person will be capable of applying a conversion as described above for creating the tiles of the second image 10.

FIG. 5a-d illustrates the conversion of the first image 8 into tiles in an embodiment, wherein the tiles are applied by printing directly on the advertisement element 2. For clarity reasons FIG. 5a-d shows the conversion for the first predefined viewpoint 4 only.

The skilled person would be capable of applying the teaching to the second predefined viewpoint 6.

FIG. 5a-d differs from FIG. 4a-d in that the graphics 18' is applied to the advertisement element 2 by printing directly on to the display surfaces 14, 16.

The conversion when shrinking the first image tiles 28', 28", 28" is based on the Projected width of the visible parts of the first display surfaces 14', 14", 14''' when viewed from above.

The resulting tiles 20', 20", 20'" can be applied to the display surfaces 14', 14", 14'" by printing or spraying directly from above onto the advertisement element 2.

FIG. 6a-d illustrates the conversion of the first image 8 into first image tiles 28', 28", 28'" in an embodiment, wherein the first image tiles 28', 28", 28'" are applied by printing directly on the advertisement element similar to the embodiment shown in FIG. 5a-d.

For clarity reasons FIG. 6a-d shows the conversion for the first predefined viewpoint 4 only. The skilled person would be capable of applying the teaching to the second predefined viewpoint 6.

Due to manufacturing tolerances of the structure of the advertisement element 2 and tolerances in applying the graphics 18', 18", 18'" to the upper surface of the advertisement element 2 the lower part 19', 19" of the first display surfaces 14", 14'", which is the part that is not covered with the graphics 18', 18", 18', and the part occluded by the proximate protrusion 12', 12", respectively, may be partly visible from the first predefined viewpoint 4.

This results in poor quality of the first image 8 when viewed from the first predefined viewpoint 4.

To solve this problem it is an option to apply a solid colour to the lower part 19', 19" of the first display surfaces 14", 14'".

However, a better option is to include a drop line 21', 21" on the tiles 20", 20'". The drop line 21', 21" is created by stretching the end of the proximate graphics 18', 18" towards the distant graphics 18", 18'" and applying this to the lower part 19', 19" of the first display surfaces 14", 14", respectively.

Alternatively by stretching the beginning of the distant graphics 18", 18'" towards the proximate graphics 18', 18" and applying this to the lower part 19', 19" of the first display surfaces 14", 14'", respectively.

FIG. 7a-d illustrates the conversion of the first image 8 into first image tiles 28', 28", 28'" in an embodiment, wherein the first image tiles 28', 28", 28'" are applied by printing directly on the advertisement element similar to the embodiment shown in FIG. 6a-d.

For clarity reasons FIG. 7a-d shows the conversion for the first predefined viewpoint 4 only. The skilled person would be capable of applying the teaching to the second predefined viewpoint 6.

Instead of drop lines 21', 21" (see FIG. 6a-d) a copy 23', 23" of the proximal graphics 18', 18" is overlaid onto the lower part 19', 19" of the first display surfaces 14", 14'", respectively.

Although this has been shown for embodiments wherein the graphics are printed directly onto the upper surface of the advertisement element, the skilled person can also apply this to embodiments wherein the graphics are printed onto a print carrier that is subsequently applied to the upper surface of the advertisement element.

Figure 8:
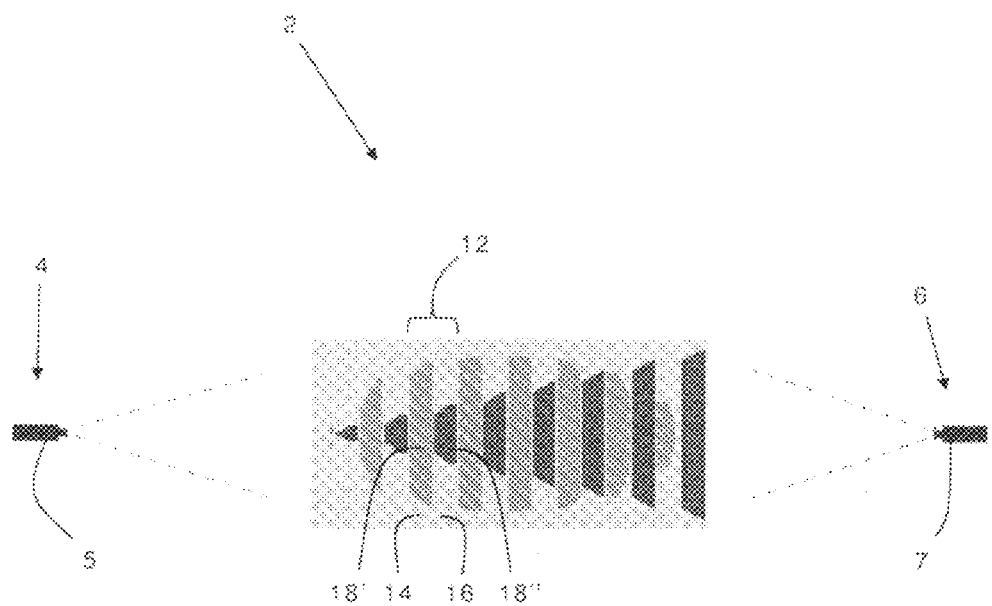
FIG. 8 shows a top view of the advertisement element, wherein the predefined viewpoints are located opposite each other.

FIG. 8 shows a top view of the advertisement element 2. Here the tiling of the first and second images 8, 10 can be seen. The tiles of the first and second images 8, 10, respectively are distributed alternately across the advertisement surface.

Figure 9:
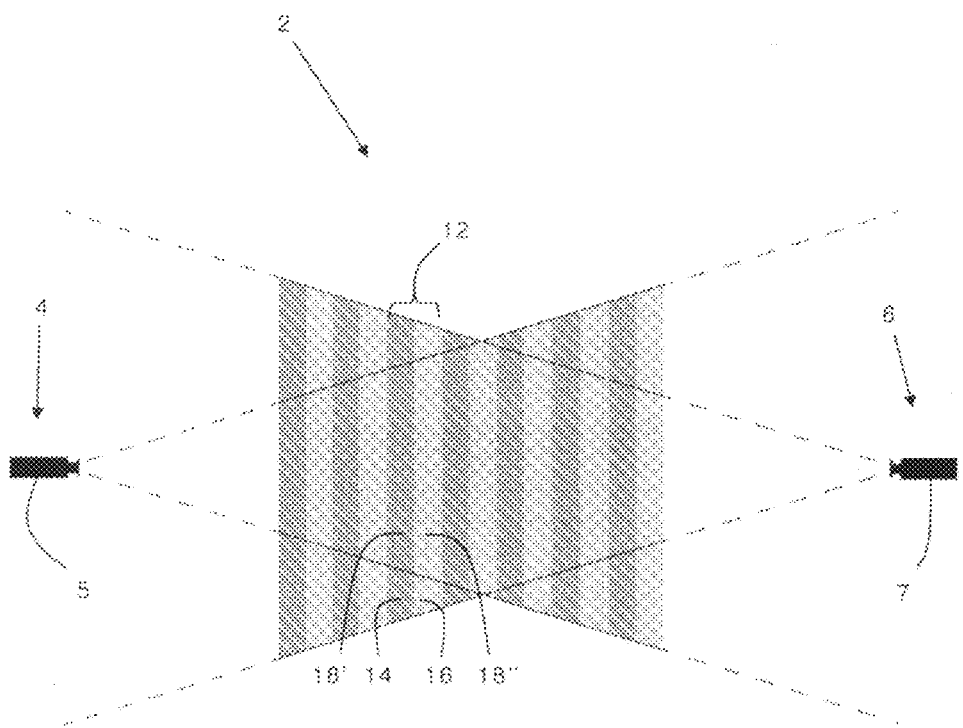
FIG. 9 shows a top view of an embodiment of the advertisement element, wherein the advertisement element is adapted for showing two inverse perspective transformations.

FIG. 9 shows a top view of an embodiment of the advertisement element 2.

In this embodiment the advertisement element 2 comprises two trapezoids merged together.

In this embodiment the first and second image 8, 10 each is an inverse perspective image having its line-of-sight corresponding to a line-of-sight from the first and/or second predefined viewpoint 4, 6, respectively.

The predefined viewpoints 4, 6 do not have to be directly opposite each other but merely placed so that the relevant display surface can be seen from said predefined viewpoint. The inverse perspective transformation shall be made according to the position of the viewpoints relative to the advertising element.

Figure 10:
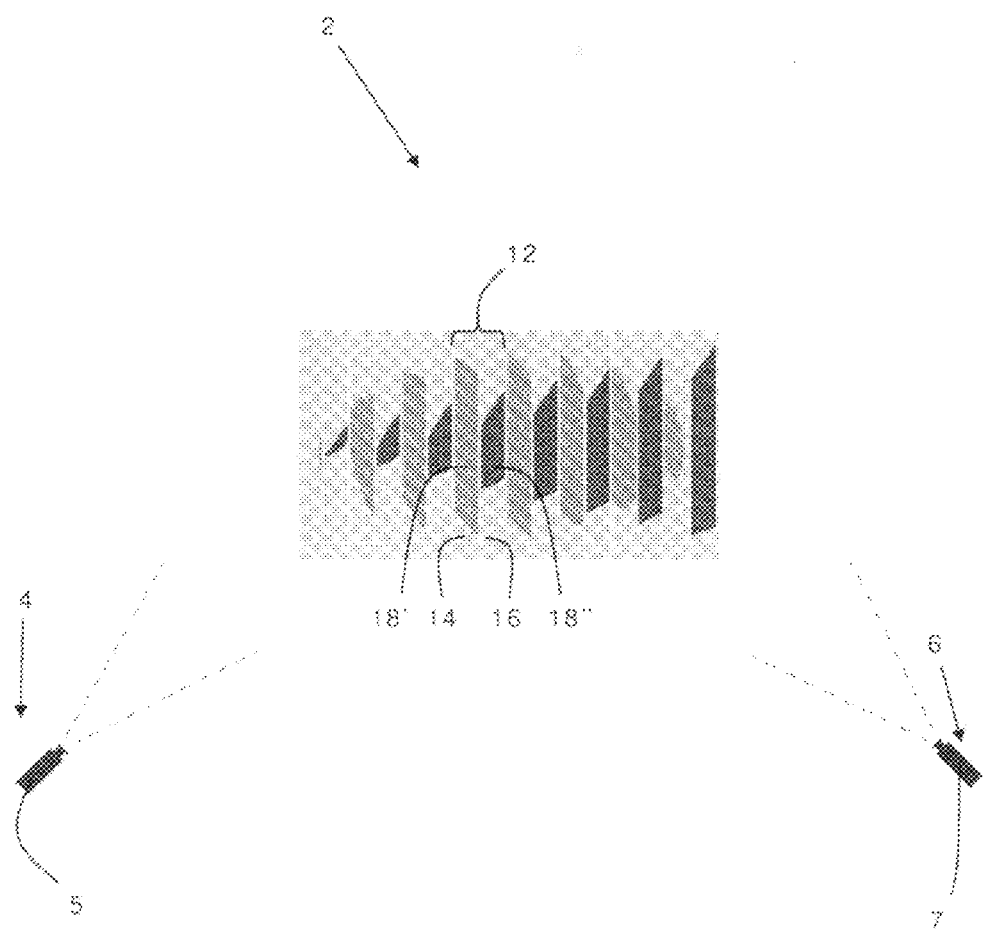
FIG. 10 shows a top view of an embodiment of the advertisement element, wherein the predefined viewpoints are, located at an angle to the advertisement element.

FIG. 10 shows a top view of an embodiment of the advertisement element 2. In this embodiment the first predefined viewpoint 4 and the second predefined viewpoint 6 is located at a slanted viewing angle to the advertisement element 2.

The first and second images, when viewed from the first and the second predefined viewpoints 4, 6, will appear as a filled circle and a filled triangle similar to the first and second images 8, 10 shown in FIGS. 1a and b.

In order to compensate for the angle between the advertisement element 2 and the first and second predefined viewpoints 4, 6 a further conversion is applied before creating the graphics 18', 18" to be applied to the first and second display surfaces 14, 16, respectively.

Figure 12:
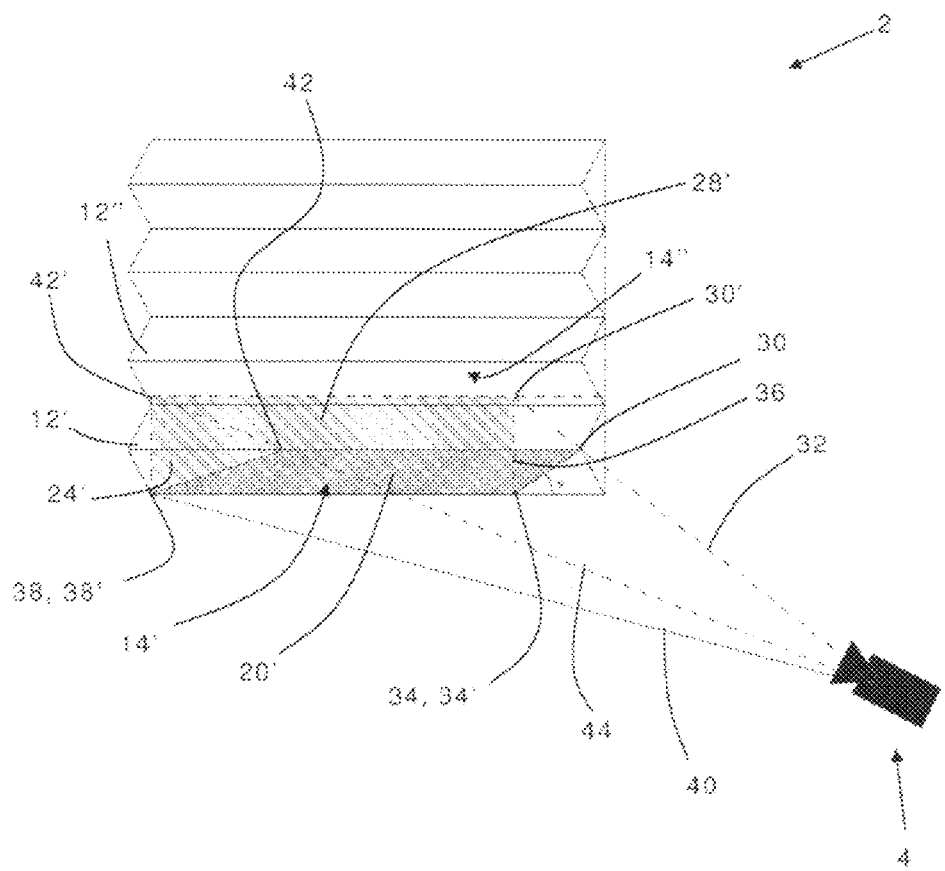
FIG. 12 illustrates how to convert the image into tiles that compensates for a slanted viewing angle.

This conversion is described further in FIG. 12.

Figure 11:
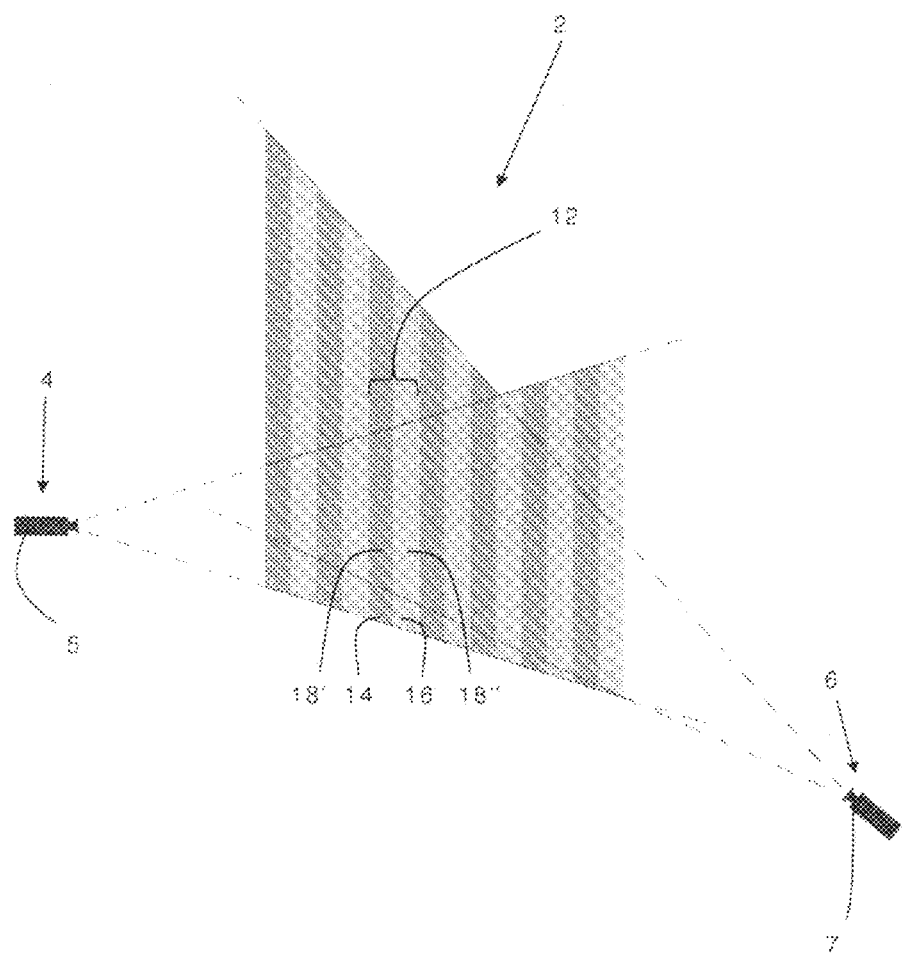
FIG. 11 shows a top view of an embodiment of the advertisement element, wherein the predefined viewpoints are in a non-symmetrical configuration.

FIG. 11 shows a top view of the advertisement element 2. The predefined viewpoints 4, 6 are located at an angle to the advertisement element 2.

In this embodiment the first and second image 8, 10 each is an inverse perspective image having its line-of-sight corresponding to a line-of-sight from the first and/or second predefined viewpoint 4, 6, respectively.

FIG. 12 illustrates how to convert the image into tiles that compensates for a slanted viewing angle.

A shadow 24' is cast by the first display surface 14' of the first protrusion 14'. A similar conversion as the one performed from 4b to 4c or 5b to 5c is applied to the first image tile 28' defined by the shadow 24'. In addition a conversion to compensate for the slanted viewing angle in to form of a skew is applied to the first image tile 28'.

The right top point 30 of the tile 20' on the first protrusion 12', which is the top point closest to the first predefined viewpoint 4, must correspond to the point 30' that marks the right boundary between the shadow 24' cast by the first display surface 14' of the first protrusion 12' and the shadow (not shown) cast by the first display surface 14" of the second protrusion 12". These points are created by the line 32 projecting from the first predefined viewpoint 4 towards the right top point 30 of the tile 20' on the first protrusion 12'.

The right bottom point 34 of the tile 20' on the first protrusion 12' must correspond to the point 34' that marks the right initiation point of the shadow 24' cast by the first display surface 14' of the first protrusion. These points are created by the line 36 that extend in a longitudinal direction from point 30' until it intersects the bottom of the tile 20' on the protrusion 12'.

The left bottom point 38 of the tile 20' on the first protrusion 12', which is the bottom point farthest away from the first predefined viewpoint 4, must correspond to the point 32' that marks the left initiation point of the shadow 24' cast by the first display surface 14' of the first protrusion 12'. These points are created by the line 40 projecting from the first predefined viewpoint 4 towards the left bottom point 38 of the tile 20' on the first protrusion 12'.

The left top point 42 of the tile 20' on the first protrusion 12', which is the top point farthest away from the first predefined viewpoint 4, must correspond to the point 42' that marks the left boundary between the shadow 24' cast by the first display surface 14' of the first protrusion 12' and the shadow (not shown) cast by the first display surface 14" of the second protrusion 12". These points are created by the line 44 projecting from the first predefined viewpoint 4 towards the left top point 42' that marks the left boundary between the shadow 24' cast by the first display surface 14' of the first protrusion 12' and the shadow (not shown) cast by the first display surface 14" of the second protrusion 12". The intersection between the line 44 and the top of the first protrusion 12' marks the left top point 42.

This provides two different skew angles "θ" and "φ".

These skew angles can be applied to the image by applying a skew angle that is an average of the two skew angles "θ" and "φ". This will provide a small error that is negligible on great distances.

Alternatively the image tile is made by ray tracing through the tile 20'.

Figure 13:
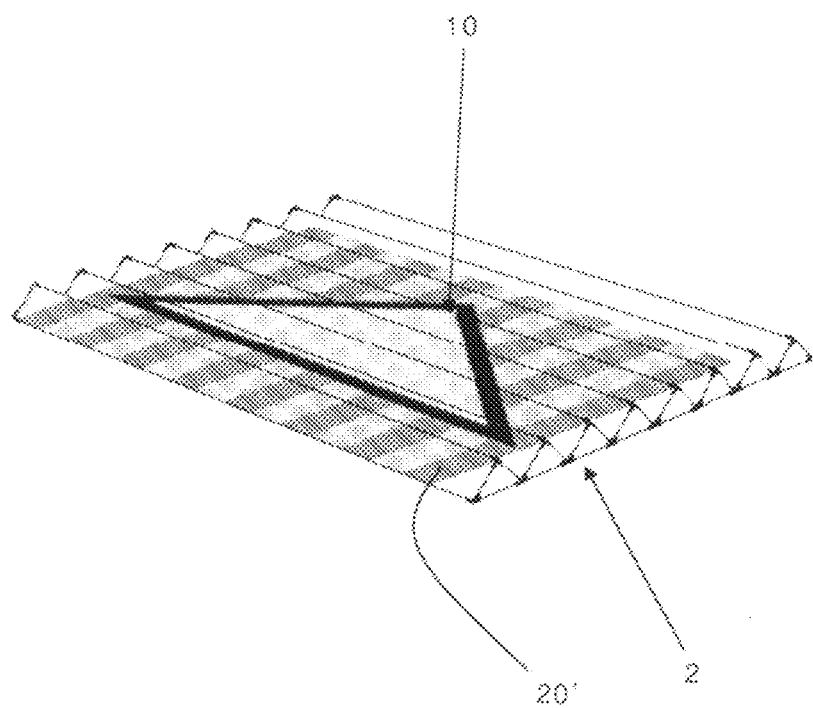
FIG. 13 illustrates the second image on the advertisement element when viewed at a slanted viewing angle.

Please note that the difference in skew in the above ray traced illustration is greatly exaggerated; partly for illustration purposes, and partly due to a short distance to the predefined viewpoint FIG. 13 illustrates the second image 10 on the advertisement element 2 when viewed at a slanted viewing angle.

The skew of the tile 20' is apparent from FIG. 13. This skew enables the tiles to appear as a single coherent image when the advertisement element 2 is viewed from a slanted viewing angle.

Figure 14:
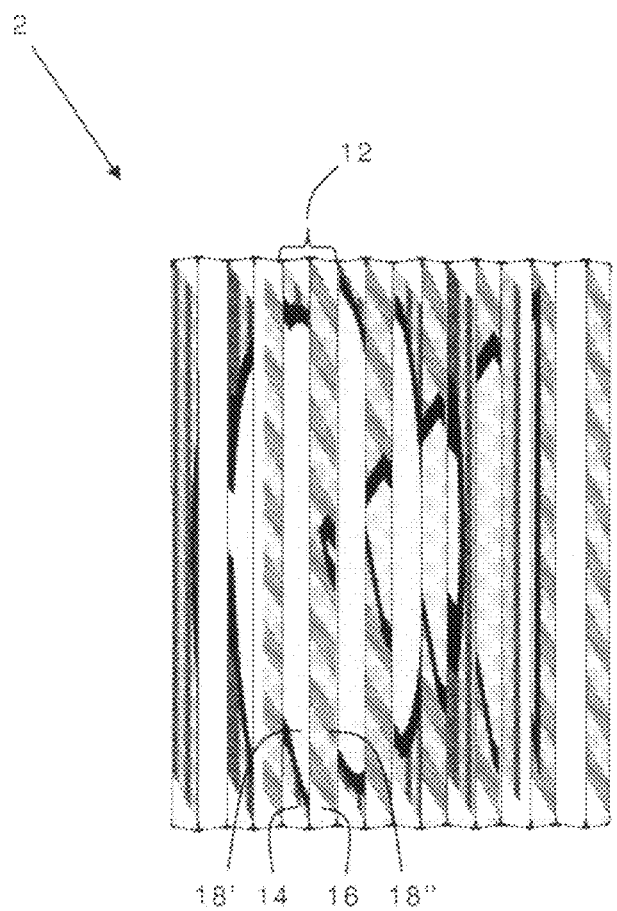
FIG. 14 shows a top view of the advertisement element in FIG. 13.

FIG. 14 is a top view of the advertisement element 2 in FIG. 13.

Figure 15A:
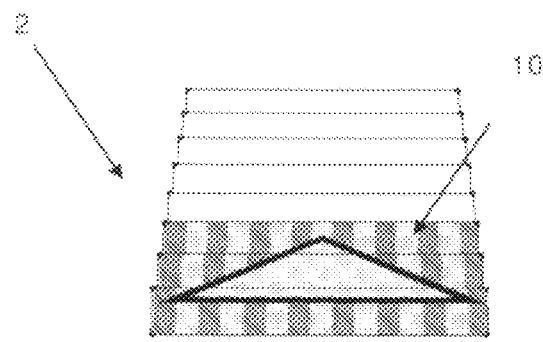
FIG. 15a-c illustrates embodiments of the advertisement element with different transformations applied to the image.
Figure 15B:
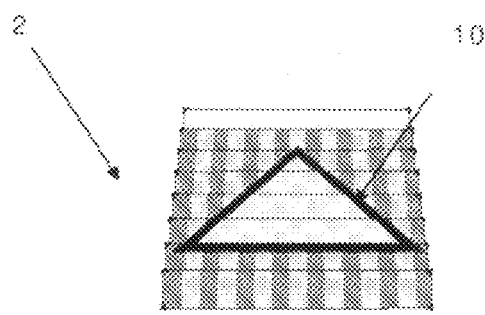
Figure 15C:
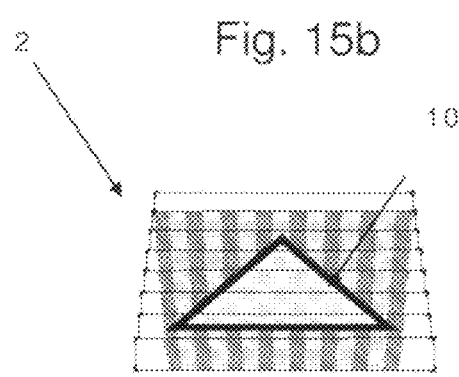

FIG. 15a-c illustrates embodiments of the advertisement element 2 with different transformations applied to the second image, Similar transformations can be applied to the first image.

In FIG. 15a-c the size and shape of the advertisement element 2 is unchanged.

In FIG. 15a the second image 10 has not been subject to other transformation than the ones needed to apply the second image 10 to the advertisement element 2. The second image 10 is depicting a triangle that will appear as lying flat on the advertisement element 2 when viewed from the second predefined viewpoint.

In FIG. 15b the second image 10 has been subject to a transformation known as stretching. The second image 10 has been stretched in a direction towards the far end of the advertisement element 2 this will provide an effect where the second image and more particularly the triangle starts to appear 3-dimensional, when viewed from the second predefined viewpoint.

In FIG. 15c the second image 10 has been subject to a transformation known as inverse perspective transformation. When viewed from the second predefined viewpoint the second image 10 will appear to be 3-dimensional. In the case shown on FIG. 15c the second image 10 appears as if it is a vertical or near vertical plane with a triangle depicted on the plane.

Figure 16:
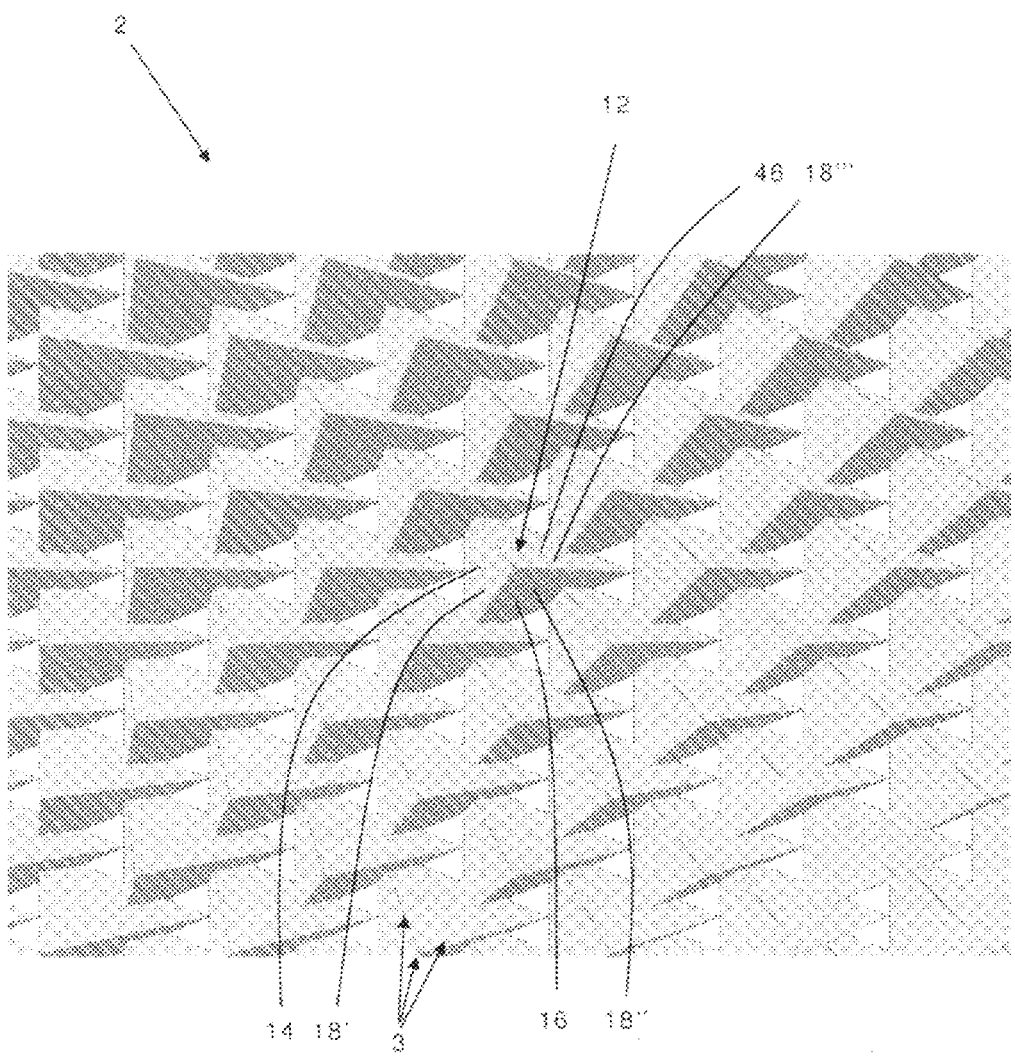
FIG. 16 shows a top view of a segment of an embodiment of the advertisement element.
Figure 17:
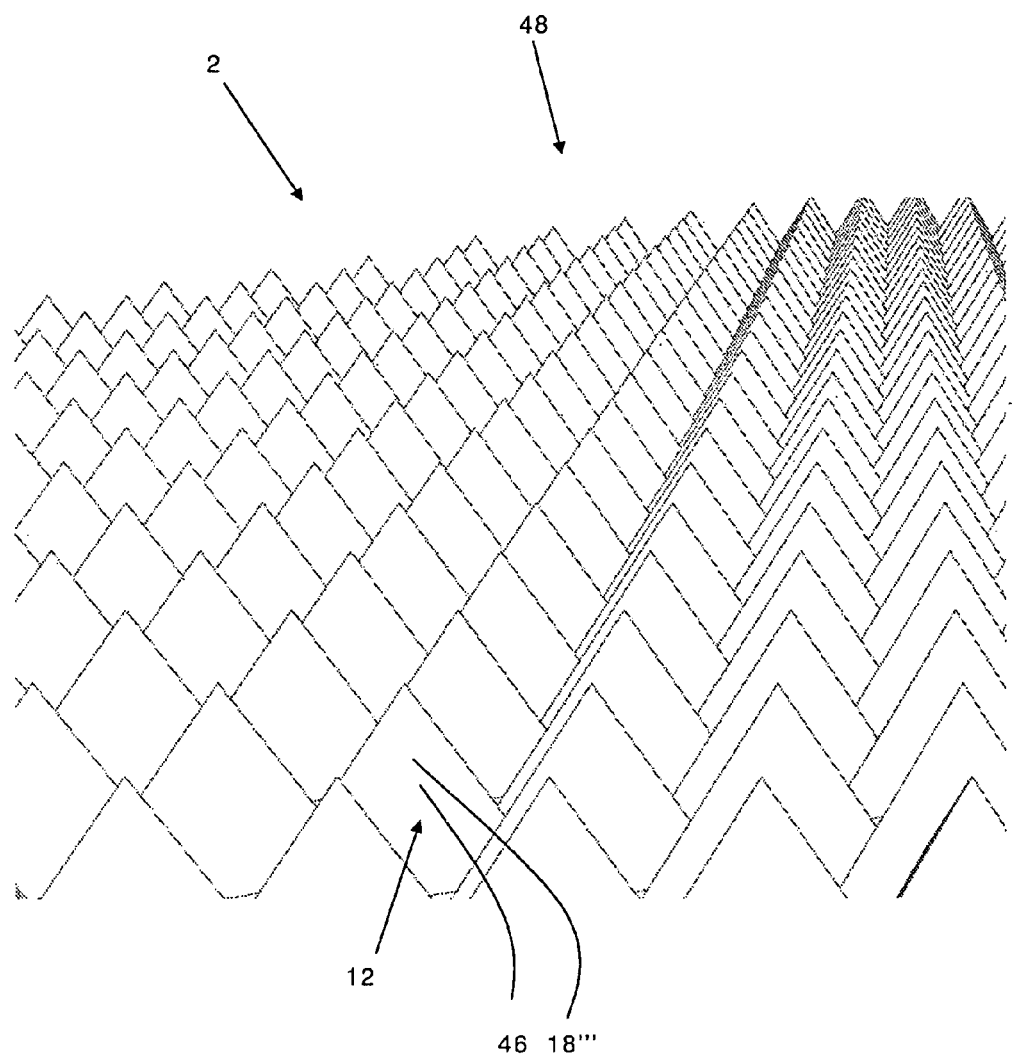
FIG. 17 shows a view of the advertisement element of FIG. 7 from an additional viewpoint.

FIGS. 16 and 17 shows an embodiment of the advertisement element 2.

FIG. 16 shows a top view of a segment of the advertisement element 2, and FIG. 17 show a view of the advertisement 2 element from an additional viewpoint.

The advertisement surface of the advertisement element 2 comprises a plurality of protrusions 12. Each protrusion 12 comprises a first display surface 14 with graphics 18', that is visible from a first predefined viewpoint 4, applied to the surface 14, a second display surface 16 with graphics 18", that is visible from a second predefined viewpoint 6, applied to the surface 16 and a third display surface 46 with graphics 18''', that is visible from a third predefined viewpoint, applied to the surface 46.

The advertisement element has a first image 8 composed of the combined graphics 18' on the first display surfaces 14. The first image 8 is visible from the first predefined viewpoint 4.

Furthermore the advertisement element has a second image 10 composed of the combined graphics 18" on the second display surfaces 16. The second image 10 is visible from the second predefined viewpoint 6.

Moreover the advertisement element has an additional or third image 48 composed of the combined graphics 18''' on the additional or third display surfaces 46. The additional or third image 48 is visible from the additional or third predefined viewpoint.

The first (not shown), second (not shown) and additional images 48 are of a solid colour in this embodiment.

Each protrusion 12 has edges 3 which comprise a separation line separating graphics from said first display surface 14, said second display surface 16 and said third display surface 46.

The invention claimed is:

1. An advertisement element comprising:
an underside configured to be positioned on a surface; and
an advertisement surface with advertisement information wherein said advertisement surface comprises a plurality of protrusions, wherein each protrusion comprises a fragment of a first display surface with graphics applied to the fragment of the first display surface, said fragment of the first display surface and said graphics being oriented towards a first predefined viewpoint and a fragment of a second display surface with graphics applied to the fragment of the second display surface, the fragment of the second display surface and said graphics being oriented towards a second predefined viewpoint, and wherein the advertisement information comprises a first image composed of the combined graphics on the first display surfaces and a second image composed of the combined graphics on the second display surfaces and wherein each of said fragment may comprise a visible and an occluded part of a respective said display surface when viewed from its predefined viewpoint said occluded part being a lower part of said fragment and wherein said first display surface and said second display surface is separated by an edge and wherein said edge comprises a separation line separating graphics from said first display surface and said second display surface and wherein a drop line is applied to said occluded, lower part of said fragment to thereby stretch the lower end of said graphics applied to said visible part of said fragment in a direction towards the lowermost part of said fragment.

2. The advertisement element according to claim 1 wherein said separation line has a thickness and a colour, said thickness and colour of said separation line are such that the separation line thereby avoids that graphics on one display surface disturb the visual impression of the graphics on the opposite display surface.

3. The advertisement element according to claim 2 wherein said separation line has a single colour.

4. The advertisement element according to claim 1 wherein the area of graphics on each successive fragment which is visible from a respective first and second viewpoint gradually decreases from a proximal to a distal end of a respective said display surface of said advertising element.

5. The advertisement element according to claim 1 wherein graphics are applied to the part of the first display surfaces being visible from the first predefined viewpoint and to the part of the second display surfaces being visible from the second predefined viewpoint.

6. The advertisement element according to claim 1 wherein a solid colour is applied to a said occluded, lower part of a said fragment and the drop line is applied over the solid colour.

7. The advertisement element according to claim 1 wherein each protrusion is configured such that the first display surface is occluded by the second display surface when the advertisement element is viewed from the second predefined viewpoint or such that the second display surface is occluded by the first display surface when the advertisement element is viewed from the first predefined viewpoint.

8. The advertisement element according to claim 1 wherein the first and second display surfaces are arranged in a back-to-back configuration.

9. The advertisement element according to claim 1 wherein the first and/or second image is an inverse perspective image having its line-of-sight corresponding to a line-of-sight from the first and/or second predefined viewpoint, respectively.

10. The advertisement element according to claim 1 wherein at least one of the first or second display surface is a planar surface.

11. The advertisement element according to claim 1 wherein at least one of the first or second display surface is a faceted surface.

12. The advertisement element according to claim 1 wherein a material from which the element is formed comprises a diffusing material, for providing a diffuse reflection of light from its first or second display surface.

13. The advertisement element according to claim 1 wherein the first and second display surfaces have a low specular reflectivity.

14. The advertisement element according to claim 1 wherein each protrusion comprises at least one additional display surface with graphics, said at least one additional display surface and said graphics being oriented towards one additional predefined viewpoint per additional display surface, applied to the at least one additional display surface, and that the advertisement information comprises one additional image per additional display surface composed of the combined graphics on said at least one additional display surface.

15. The advertisement element according to claim 14 wherein each protrusion comprises one additional display surface with graphics, said one additional display surface and said graphics being oriented towards one additional predefined viewpoint, applied to the one additional display surface, and that the advertisement information comprises one additional image composed of the combined graphics on said one additional display surface.

16. A method of capturing advertisement images, said method includes positioning a first image capturing device in a first predefined viewpoint and a second image capturing device in a second predefined viewpoint, positioning an advertisement element according to claim 1 in the line-of-sight of the first and second image capturing device, such that the first image is visible from the first predefined viewpoint and such that the second image is visible from the second predefined viewpoint, and capturing the first or second image by means of the first or second image capturing device respectively.

17. A method of creating advertisement element, comprising:
   establishing relative positions for the advertising element;
   providing an advertising element according to claim 1, wherein the first and the second predefined viewpoints of the advertising element are based on said relative positions to form the first image that is coherent when viewed from the first predefined viewpoint and the second image that is coherent when viewed from the second viewpoint.

18. The method according to claim 17 wherein the preparation of the advertising element includes;
   configuring the protrusions for displaying on the advertising element, the first image to be visible from the first predefined viewpoint and composed of graphics on the first display surfaces, and the second image to be visible from the second predefined viewpoint and composed of graphics on the second display surfaces,
   dividing the first and second image into tiles corresponding to the graphics to be applied to the first and second display surfaces, respectively, and
   applying the tiles in the form of graphics to the first and second display surfaces, respectively.

19. The method according to claim 17 wherein the preparation of the advertising element includes; applying a transformation to the first and second image before dividing the image into tiles.

20. The method of creating an advertisement element according to claim 18 wherein the transformation is selected among inverse perspective transformations, stretching, skewing, affine transformations, color transformation, color enhancement, sharpening, blurring or ray tracing.

\* \* \* \* \*